April 7, 1936.  R. W. CARLSON  2,036,458
TELEMETRIC DEVICE
Filed Aug. 4, 1934   2 Sheets-Sheet 1
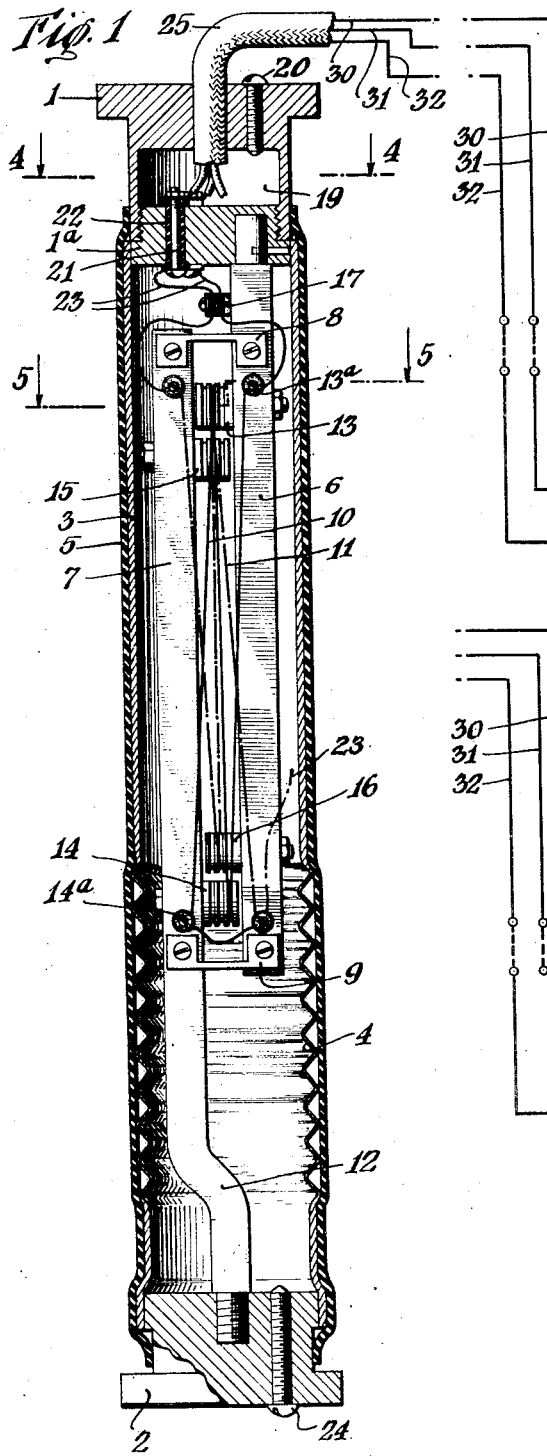
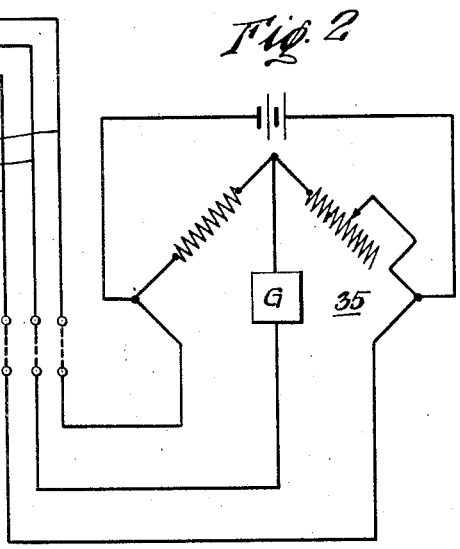
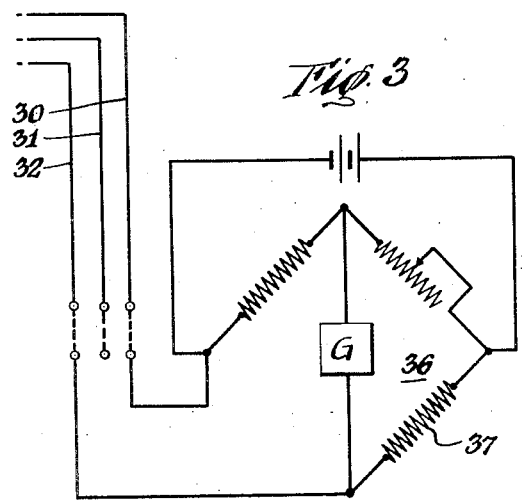
INVENTOR
Roy W. Carlson
BY
Chester F. Carlson
ATTORNEY

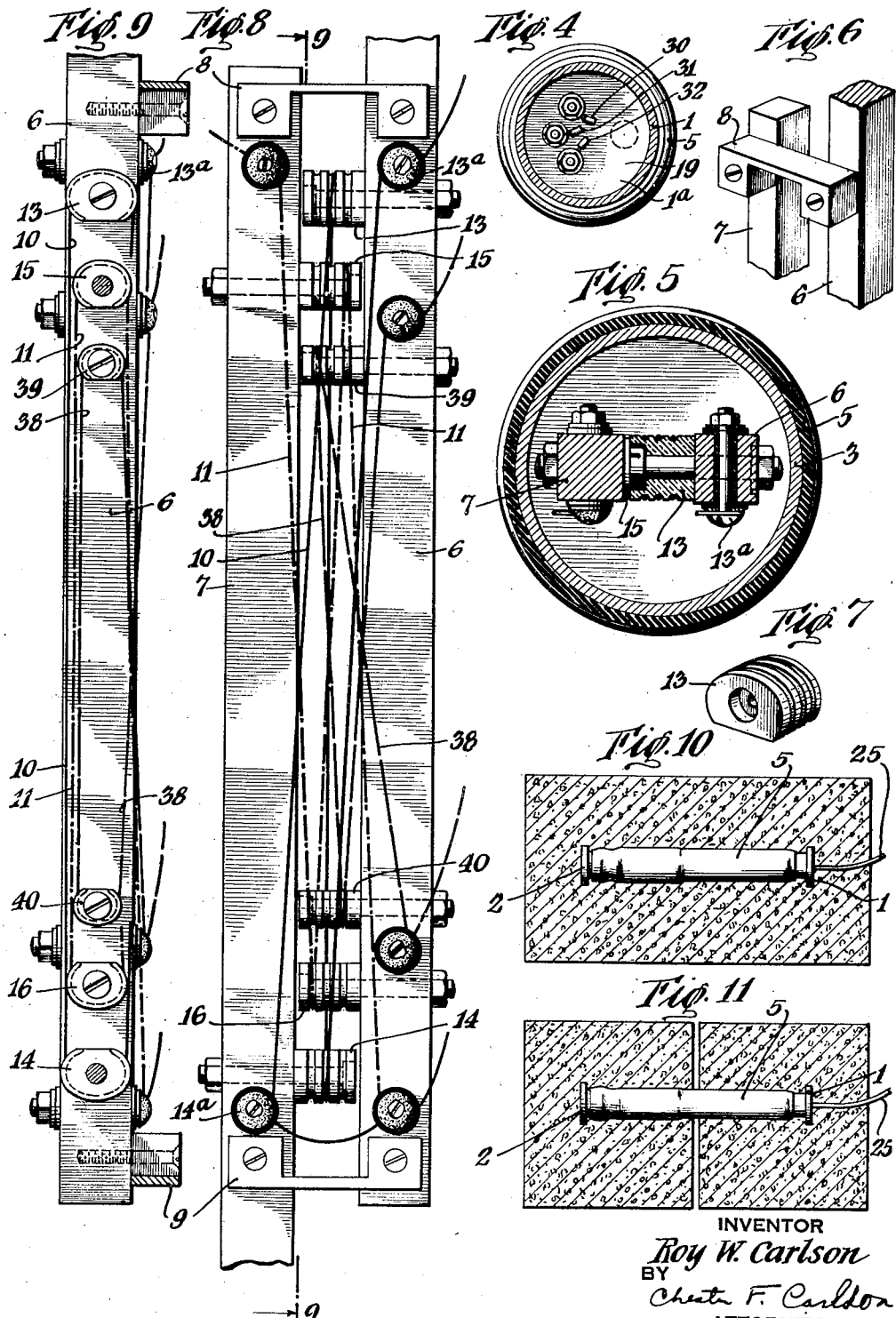

Patented Apr. 7, 1936

2,036,458

UNITED STATES PATENT OFFICE 2,036,458

TELEMETRIC DEVICE

Roy W. Carlson, Berkeley, Calif.

Application August 4, 1934, Serial No. 738,457

25 Claims. (Cl. 177—351)

This invention relates to electric telemetric devices and more particularly to instruments for determining the dimensional changes in a structure.

This is a continuation in part of my copending application, Serial No. 455,244, filed May 24, 1930, for Electrical strain gauges.

My device may find application, for example, as a gauge for measuring strain, or change in dimension especially in inaccessible places, such as the interior of a body of concrete. It may likewise be used as a joint meter to measure the changes in width of joints between adjacent parts of a structure. Various other uses and applications will occur to any one skilled in the art.

The dimensional changes may be measured by causing certain changes in the electrical resistances of conducting elements and determining the relative magnitude of such changes, said magnitudes bearing a definite relation to the distances between two reference points in the structure being measured.

It is a well known fact that when tensile stress in a metallic conductor is varied, the electrical resistance of the metallic conductor changes, not only because of the change in length and cross sectional area of the conductor, but also because of a certain effect of tension upon electrical resistance. Thus, if a system of metallic conductors is so arranged that a change in distance between two anchor points either increases or decreases the tension on the metallic conductors, said change in distance will be accompanied by a change in the electrical resistance of the metallic conductors, enabling an observer to determine said change in distance by measuring the change in electrical resistance of the metallic conductors.

Since electrical resistances of metallic conductors vary not only with length change, but also with temperature change, it is advisable to eliminate the effect of temperature change. This may be accomplished by measuring, instead of merely one resistance, the ratio of resistances of two systems of metallic conductors made of identical materials, said systems being so arranged as to be unequally influenced by change in distance between two anchor points. Since the resistance of each system of metallic conductors is altered to the same percentage when the temperature is changed, the resistance ratio is not altered by a change in temperature.

To further eliminate uncertainties of strain determination, three systems of metallic conductors may be employed, so arranged that when the distance between two anchor points increases, the tension on one system increases, the tension on a second system decreases, and the tension on a third system is constant. This allows a separate determination of strain by measurement of electrical resistance ratio of any two of the three systems.

Uncertainties of strain measurement may be still further reduced by filling all excess space within the cover of the electrical strain gauge with an insulating fluid or semi-fluid which does not hamper the behavior of the metallic conductors. This eliminates to a large degree, the danger of moisture coming in contact with the metallic conductors and thereby influencing measured resistances.

According to a preferred form of my invention the telemeter may comprise two spaced anchoring members connected by a framework carrying a pair of coils of wire under tension. The framework may be arranged to increase the tension of one coil and decrease the tension of the other coil when the anchoring members move relatively to each other. Thus the electrical resistances of the two coils may be varied in opposite sense, respectively, due to the effect of the movement.

Suitable electric measuring devices may be associated with these coils whereby the variations may be determined. These devices may be preferably arranged to measure the ratio of the resistances of the coils. This is an important feature of my invention whereby the effect of temperature changes is eliminated and much greater accuracy of measurement is achieved. Thus the ratio of two nearly equal resistances may be measured to ten times the accuracy of the resistances themselves. Furthermore, the interconnecting conductors enter into the measurement of a ratio to a much smaller extent than they enter into the measurement of the resistances.

According to a modified form of my invention a coil under fixed tension may also be included within the telemeter. This may be used to provide an additional determination of the movement in the structure being measured. The fixed coil may be measured, for example, along with one variable coil as an independent determination or as a check on the first method of measurement using the two variable coils.

An important feature of my device is the arrangement for making temperature determinations. These may be made by measuring the combined resistance of the two variable coils. The combined resistance is, for practical purposes, independent of the strain determinations because of the compensating variations in tension of these coils. Where a fixed coil is included in the meter the temperature measurements may likewise be made by a determination of its resistance.

The coils and their supporting framework may be enclosed in a case filled with an insulating liquid or semi-liquid and the conductors leading from the telemeter to the electric measuring equipment may enter the telemeter through a sealing chamber filled with an insulating sealing substance. Thus the coils will be protected from humidity changes, corrosive action and short circuits. This is very important, especially where the device is used in concrete structures where moisture is always present in variable amounts. The outside of the case may be protected by a sleeve of soft material such as rubber, for example, whereby the rugged construction of the telemeter is supplemented and the entire structure is made substantially fool-proof and very durable. It is thus adapted for efficient utilization in a wide variety of conditions and with all sorts of materials without the need of undue precautions in handling.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a sectional elevation of a telemetric transmitter device;

Fig. 2 shows an electrical measuring circuit for use therewith;

Fig. 3 shows another measuring circuit;

Fig. 4 is a section on the line 4—4 of Fig. 1;

Fig. 5 is an enlarged section on the line 5—5 of Fig. 1.

Fig. 6 shows a detail of the construction of the telemetric transmitter device;

Fig. 7 is a perspective of one of the insulating spools;

Fig. 8 shows part of the internal structure of a modified form of the telemeter having three coils;

Fig. 9 is a section on line 9—9 of Fig. 8;

Fig. 10 illustrates an application of the device as a strain meter in monolithic concrete structures; and Fig. 11 illustrates the use of the device as a joint meter.

Referring now to the drawings, and more particularly to Fig. 1, flanged anchoring members 1 and 2 are held in spaced relation and are joined by a case 3 comprising a cylindrical metal tube which is formed with annular corrugations 4 for a portion of its length whereby the case is made elastic so that its length may be varied by relatively small longitudinal forces. Member 1 is threaded onto plug 1a which fits into the end of case 3. Member 2 fits directly into the other end of the case. The case is welded or soldered to parts 1a and 2 to form a sealed chamber.

The case may preferably be made of brass or steel and the annular corrugations 4 may be made, for example, by rolling the tube with complementary interior and exterior corrugated rollers or by cutting alternate interior and exterior grooves in the case where the thickness of the wall permits. It will sometimes be advantageous to reduce the thickness of the wall of case 3 where the corrugations occur to achieve greater flexibility. Case 3 and a portion of both anchoring member are covered with a sleeve 5 of soft material such as a rubber hose.

A framework is provided within the sealed chamber and comprises a rigid bar 6 of rectangular cross-section secured at one end in plug 1a and extending along the case parallel to the axis thereof. A similar rigid bar 7 is secured in anchoring member 2 and also extends parallel to the axis of the chamber and in spaced relation beside bar 6. To aid in assembly bar 7 may preferably have a double bend at 12 so that it may screw into a tapped hole at the center of member 2.

Spacing members in the form of flat metal springs 8 and 9 aid in maintaining the spaced relation between bars 6 and 7. One of these spacing members is shown more clearly in Fig. 6. The planes of the springs are normally perpendicular to the axis of the case and the springs may preferably have enlarged ends whereby they may be rigidly secured to the bars 6 and 7. Thus they allow the bars a limited relative movement lengthwise due to their elasticity, but effectively prevent a relative movement of the bars in any other manner.

Two coils, 10 and 11 of small wire or filament are mounted within the case between bars 6 and 7. Coil 10 is wound over insulating spools 13 and 14 (see Fig. 7) formed of porcelain or glass. Spool 13 is mounted on the inner face of bar 6, and spool 14 on the inner face of bar 7, spool 13 being relatively near anchoring member 1 and spool 14 being between spool 13 and member 2.

Coil 11 is wound on insulating spools 15 and 16 of smaller diameter than 13 and 14. Spools 15 and 16 are mounted on the inner faces of bar 7 and 6, respectively, between spools 13 and 14, spool 15 being the closer to 13 and spool 16 the closer to 14. Both coils are secured at their ends to binding posts projecting from bars 6 and 7, but insulated therefrom. Coil 10, for example, is secured to binding posts 13a and 14a (see Fig. 5). It will be apparent that with the above construction if anchoring members 1 and 2 are moved further apart spools 13 and 14 will be moved further apart and increase the tension on coil 10 whereas spools 15 and 16 will be moved closer together and the tension on coil 11 will thereby be decreased. Conversely if members 1 and 2 are moved closer together the tension on coil 10 is reduced and that on coil 11 increased.

Since the spools supporting inner coil 11 are of smaller diameter than those supporting coil 10 the coils do not interfere or make contact with each other. The coils are, however, so close to each other that any external temperature variations will ordinarily affect them both to the same extent. It is desirable that the dimensions of the device be so proportioned and the number of turns of the coils be so related that approximately the same length of wire is on each coil.

After assembly case 3 may be filled with a suitable insulating liquid, such as castor oil, or a high viscosity mineral oil, for example, through the oil filling hole in member 2. The oil may preferably be introduced while hot after which tight-fitting screw 24 is screwed into the oil filling hole and sealed with solder or joint compound, if necessary. As the hot liquid in case 3 cools a small vacuous space is formed within the case thus allowing for volume changes due to expansion or contraction of bellows portion 4 of the case. Anchoring members 1 and 2 may be nickel-plated if desired in order to protect them from corrosion.

For outside circuit connections to the coils insulated cable 25 passes through a hole in anchoring member 1 into chamber 19 formed within member 1. Cable 25 carries three wires 30, 31 and 32 which are connected to individual machine bolts 21 passing through plug 1a from the inside of the case (see Fig. 4). Bolts 21 are insulated from the plug by sleeves 22. Conductors 23, within the case, connect the bolts 21 to the ends of coils 10 and 11, one of the conductors serving as a common lead for both coils.

Conductors 23 may be covered with a suitable insulation, such as enamel, for example, and they may be held in position by a block of glass or porcelain insulation 17. It is undesirable to use rubber or other sulfur-bearing substances within the case due to the corrosive effect on the coils.

In assembling the telemeter the inside framework is first put together. Coil 11 is then wound over the inside spools and clamped at its ends. The tension of all the strands is adjusted until they are all equally stressed as indicated by similar musical notes when the separate strands are plucked with the fingers.

Coil 10 is next wound about its spools and a weight is hung from the free end of this coil after which the tensions of the strands are adjusted. All terminals are soldered and wires 23 and cable 25 are soldered to the proper binding posts. Case 3 is placed in position and anchor member 2 is screwed onto the end of bar 7. The case is then soldered to members 1a and 2 and sealing compound is placed in chamber 19. The rubber tubing 5 may then be slipped over the case.

The electrical measuring circuits shown in Figs. 2 and 3 provide means for determining the resistances and the ratios of resistances of the tension coils 10 and 11. The measuring equipment may be enclosed in a suitable portable case if desired or it may be otherwise mounted.

Conductor 30 is connected through cable 25 to a terminal of coil 10, conductor 31 is connected to a terminal common to both coils 10 and 11 and conductor 32 is connected to the remaining terminal of coil 11. Wheatstone bridge circuit 35 (Fig. 2) is connected for the measurement of the resistance ratios of the coils. Bridge circuit 36 (Fig. 3) is connected for the measurement of the combined series resistance of the coils, having connected in its circuit, for this purpose, a standard resistance element 37.

Figures 8 and 9 illustrate a modified form of the invention having a third coil 38 inside the other two coils. Coil 38 is wound on spools 39 and 40, both of which are secured to bar 6 so that this coil is held at fixed tension. The remaining structure shown in Figs. 8 and 9 is similar to the structure of Fig. 1.

Where three coils are used it is necessary to provide a cable having four conductors, two of the conductors being connected to terminals common to two of the coils.

Fig. 10 illustrates the use of the device as a strain gauge for determining dimensional changes within a body of concrete. In this case the gauge is embedded in the concrete when it is poured into the forms and lead wire 25 is carried through the concrete structure to an outlet point where the measuring equipment may be attached. The anchoring members 1 and 2 will become anchored in the concrete as it sets and will thereafter move relative to each other with any dimensional changes (i. e. strain) in the concrete. Rubber cover 5 will protect the case 3 and allow free movement and expansion or contraction of the case and its enclosed framework.

In Fig. 11 the device is shown across a joint in a concrete structure, anchoring member 1 being embedded in one unit of the structure and anchoring member 2 in an adjoining unit. The device is thus adapted to determine any change in separation at the joint.

The operation is as follows:

The meter is embedded in a structure as described above or is otherwise attached for purposes of measurement. The anchoring members 1 and 2 will thereafter vary in separation as the result of any dimensional changes in the structure between the anchoring points. Such change will vary the tension on coils 10 and 11 in opposite sense, one of the coils increasing in tension as the other decreases. Measurements are made from time to time by the measuring equipment.

If Wheatstone bridge 35 (Fig. 2) is used, the ratio of the resistances of coils 10 and 11 may be measured. It it is desired to determine the temperature at the meter the measuring circuit is connected as shown at 36 (Fig. 3) whereby coils 10 and 11 are connected in series in one arm of the bridge and standard resistance 37 is connected in the other arm.

With the modified form of meter shown in Figs. 8 and 9 the bridge circuits may likewise be connected for measuring the resistance ratios of coils 10 and 38 or 11 and 38 or for measuring the resistance of coil 38 alone. Thus a check on the other strain determinations may be had, as well as a check on the temperature determination.

The gauge may be calibrated in any convenient manner before use. Forces may be applied to the ends, for example, the distance between the anchoring members determined, and the corresponding electrical measurements made simultaneously therewith.

As an example of what may be done in practice it has been found satisfactory in a structure similar to Fig. 1 to use high carbon steel music wire of three to seven thousandths of an inch in diameter for the coils and to make coil 10 seven strands in length and coil 11 nine strands in length. The wires may be held at a tension of approximately 100,000 pounds per square inch. The outer spools 13 and 14 have in some cases been separated two and one half inches and the inner spools 15 and 16 have been separated one and three fourths inches. Wide variations in the above dimensions may be made, however.

In the instruments which have been proposed in the past for making this type of measurement, such as those using a pile of carbon plates, many defects have been encountered which are entirely absent in the present invention.

Firstly, the resistance variations in such carbon pile devices occur principally at the joints between the carbon discs so that they are essentially contact devices. This accounts partially for their progressive changes due to causes other than strain, and otheir generally erratic behavior. It is well known that uniform resistance effects cannot be obtained in mechanisms operating on this principle.

Secondly, it is difficult to protect such a device by a sealed case and when they have been imbedded in concrete serious errors have been caused by variations in humidity within the case.

Thirdly, additional means have been necessary in these devices for temperature measurement.

Lastly, although a carbon pile instrument employing two piles of carbon plates affected in opposite sense due to changes in length of the instrument has been proposed in an attempt to obtain a linear relationship between change in length and difference in resistance of the two piles, it has never been found practicable to use such a device for measuring strains in concrete.

The present invention on the other hand utilizes changes in stress of a continuous conductor whereby freedom of motion of electrons within the conductor is varied. Thus the resistance is changed according to a definite physical law and the element of chance is eliminated. This provides a dependable system which will operate with great fidelity over long periods of time and under a great variety of physical conditions.

The present device is adequately protected in a sealed, oil filled case so that moisture can never reach the coils even where they are embedded in concrete for years.

Furthermore, the telemeter is especially convenient and economical in providing for both strain and temperature determinations with the same set of coils and the same measuring circuits. With the modified form wherein a third coil is provided both the strain and temperature determinations may be verified by a plurality of measurements using different coil combinations and thereby increasing the accuracy of the determinations.

With the present arrangement the amount of strain may be determined by merely multiplying the change in ratio by a constant.

Although only a few of the forms in which this invention may be embodied have been shown herein, it is to be understood that the invention is not limited to any specific construction, but may be embodied in various forms without departing from the spirit of the invention or the scope of the appended claims.

What is claimed is:

1. A telemetric device comprising a first and second anchoring member, a first and second wire, frame means to maintain a tension on each of said wires, said frame means being connected to said anchoring members and said wires so as to increase the tension on said first wire and to decrease the tension on said second wire responsive to relative motion of said anchoring members in one direction and conversely responsive to relative motion of said anchoring members in the opposite direction.

2. The method of measuring the change in distance between two points in a structure which comprises increasing the tension on a first conductor and decreasing the tension on a second conductor in proportion to said change, measuring the ratio of the electrical resistances of said conductors and then measuring the ratio of the resistance of one of said conductors to that of a third conductor whose tension has not been changed.

3. A combined telemetric and temperature measuring device comprising a pair of anchoring members, a pair of wires, frame means to apply an initial tension to each of said wires and to increase the tension of the first of said wires and correspondingly decrease the tension of the second of said wires responsive to a relative motion of said anchoring members, whereby the ratio of the electrical resistances of said wires affords a measure of said relative motion and the combined resistance of said wires affords a measure of the temperature at said device, said frame means comprising a pair of relatively movable rigid parts connected respectively to said pair of anchoring members, and both connected to different parts of both said wires.

4. The method of measuring the change in distance between two points in a structure which comprises oppositely varying the tension on two conductors in proportion to said change and then measuring the ratio of the electrical resistances of said conductors.

5. A telemetric device comprising a pair of spaced anchoring members, a pair of wires looped into oval coils, said coils being arranged with their axes and longest sides parallel, the first of said coils being larger than and enclosing the second of said coils, frame means to apply tension to each of said coils longitudinal to the longest sides thereof and to vary the tensions thereof in different manners, respectively, responsive to variations in the spacing of said anchoring members, said frame means comprising a pair of relatively movable rigid parts connected respectively to said pair of anchoring members and each having portions about which both said coils are looped.

6. An electrical strain gauge device comprising a pair of anchoring members each provided with means for anchoring said members at two different points of reference on a member subject to strain and in the line of said strain, means on each of said members adapted to have one side of a coil looped around it, a coil of electrical conducting material looped around said last mentioned means on the two members with the axis of said coil substantially perpendicular to the line of strain whereby said coil loop resists relative movement of the anchoring members away from each other along said line and is stressed upon movement, and means for placing an initial stress upon said coil before said anchoring members are anchored to the strain member with each element of the coil equally stressed.

7. An electrical strain gauge device comprising a pair of anchoring members each provided with means for anchoring said members at two different points of reference on a member subject to strain and in the line of said strain, said anchoring members having overlapping extensions, coil support means on each of said extensions each arranged to have one side of a coil looped around it, a coil of electrical conducting material looped around two of said means on the two extensions, a second coil of electrical conducting material looped around two other of said means on the two extensions with the axis of said coils substantially perpendicular to the direction of strain and with the loops of the coils resisting relative movement of said anchoring members toward and away from each other respectively in the line of strain, said coils and extensions placing an initial stress upon said coils before said anchoring members are anchored to the strain member with each element of the respective coils equally stressed.

8. A device for measuring changes in separation of two points of reference in a structure comprising a pair of anchoring members having means for anchoring them at said points of reference, a first pair of strand supporting means, a first strand of electrically conductive material strung between said pair of supporting means to connect them, a second pair of strand supporting means, a second strand of electrically conductive material strung between said second pair of supporting means to connect said second pair of means, frame means to apply an initial tension to both said strands, and responsive to an increase in separation of said anchoring members to increase the tension of said first strand and responsive to a decrease in separation of said anchoring members to increase the tension of said second strand, whereby said changes in separation will cause changes in the electrical conductivity of said strands, said frame means comprising at least two relatively movable rigid members connected, respectively, to said pair of anchoring members and both connected to different portions on both said strands.

9. A device for measuring changes in separation of two points of reference in a structure comprising a pair of anchoring members having means for anchoring them at said points of reference, a first pair of strand supporting means, a first strand of electrically conductive material strung between said pair of supporting means to connect them, a second pair of strand supporting means, a second strand of electrically conductive material strung between said second pair of supporting means to connect said second pair of means, frame means to apply an initial tension to both said strands, and responsive to an increase in separation of said anchoring members to increase the tension of said first strand and decrease the tension of said second strand and responsive to a decrease in separation of said anchoring members to decrease the tension of said first strand and increase the tension of said second strand, whereby said changes in separation will cause changes in the electrical conductivity of said strands, said frame means comprising at least two relatively movable rigid members connected, respectively, to said pair of anchoring members and both connected to different portions on both said strands.

10. A telemetric device comprising a first and second member adapted to vary in separation, a first strand of electrically conductive material, means arranged so as to apply a tensioning force to said strand and controlled by said members so as to vary said force as a first function of the separation of said members, a second strand of electrically conductive material, and means arranged so as to apply a tensioning force to said second strand and controlled by said members so as to vary said force as a second and different function of the separation of said members.

11. A telemetric device comprising a first and second member adapted to vary in separation, a first strand of electrically conductive material, means arranged so as to apply a tensioning force to said strand and controlled by said members so as to increase and decrease said force with increase and decrease respectively of the separation of said members, a second strand of electrically conductive material, and means arranged so as to apply a tensioning force to said second strand and controlled by said members so as to decrease and increase said force with increase and decrease respectively of the separation of said members.

12. A telemetric device comprising a first and second anchoring member adapted to vary in separation, a first and second strand of electrically conductive material, means normally to apply a tension to both of said strands and to connect said strands to said anchoring members, said means connecting said first strand so as to resist by its tension an increase in separation of said anchoring members and said second strand so as to resist by its tension a decrease in separation of said anchoring members.

13. A telemetric device comprising a first and a second anchoring member adapted to be anchored at separate points in a structure, a first and a second frame member mechanically connected respectively to said first and second anchoring members whereby said frame members will move relative to each other responsive to a change in separation of said anchoring members, a first and second strand of electrically conductive material each secured at one of its ends to said first frame member and at the other of its ends to said second frame member, said frame members normally holding said strands in tension, said first strand being arranged so as to resist by its tension relative movement of said frame members responsive to an increase in separation of said anchoring members and said second strand being arranged so as to resist by its tension relative movement of said frame members responsive to a decrease in separation of said anchoring members.

14. A telemetric device comprising a first and a second anchoring member, first and second wire supports mounted respectively on each of said members whereby said supports will move with their respective anchoring members, a first and second wire, each secured at one of its ends to said first wire support and at the other of its ends to said second wire support, said supports applying an initial tension to said wires, said first wire being arranged so as to resist by its tension relative motion of said anchoring members in a direction tending to increase their separation and said second wire being arranged so as to resist by its tension relative motion of said members in a direction tending to decrease their separation.

15. A device for measuring the magnitude of strain in a member subject to strain comprising two anchoring members provided with means for anchoring them at two points of reference in said member and in the line of said strain, a strand of electrically conductive material, frame means to apply an initial tension to said strand and to vary the length of said strand within its elastic limits responsive to variations in the separation of said anchoring members and in proportion to the magnitude of separation thereof, whereby the electrical resistance of said strand will afford an indication of the magnitude of said strain, said frame means comprising at least two relatively movable rigid members connected, respectively, to said two anchoring members and to said strand.

16. An electrical strain gauge device comprising a pair of anchoring members each having means for anchoring said members at two different points of reference on a member subject to strain and in the line of said strain, said anchoring members having overlapping extensions, means on each of said extensions arranged to have one side of a coil looped around it, a coil of electrical conducting material looped around said last-mentioned means on the two extensions with the axis of said coil substantially perpendicular to the line of strain whereby said coil loop resists relative movement of the anchoring members away from each other along said line, means for placing an initial stress upon said coil, each strand of said coil being equally stressed.

17. An electrical strain gauge device comprising a pair of anchoring members each having means for anchoring said members at two different points of reference on a member subject to strain and in the line of said strain, said anchoring members having overlapping extensions, means on each of said extensions arranged to have one side of a coil looped around it, a coil of electrical conducting material looped around said last mentioned means on the two extensions with the axis of said coil substantially perpendicular to the line of strain whereby said coil loop resists relative movement of the anchoring members toward each other along said line, means for placing an initial stress upon said coil, each strand of said coil being equally stressed.

18. A telemetric device comprising a pair of spaced anchoring members, a first plurality of substantially parallel conducting strands, a second plurality of substantially parallel conducting strands, frame means arranged so as to apply an initial substantially equal tension to all said first strands and an initial substantially equal tension to all said second strands, means mechanically connecting said frame means to said anchoring members, said first strands being arranged so as to resist by their tension a decrease in spacing of said anchoring members and said second strands being arranged so as to resist by their tension an increase in spacing of said anchoring members.

19. A telemetric device comprising a pair of anchoring members, a wire, means arranged so as to support said wire and apply an initial tension thereto, means connecting said supporting means to said anchoring members whereby variation in spacing of said anchoring members varies the tension on said wire, a liquid-tight case enclosing said supporting means and said wire and a bath of insulating liquid within said case in contact with said wire.

20. A telemetric device comprising a pair of spaced anchoring members, a strand of electrically conducting material, frame means arranged so as to support said strand and apply an initial tension thereto, said means being arranged so as to vary the tension on said strand responsive to relative movement of said anchoring members, a liquid-tight case surrounding said frame, an insulating liquid in said case and in contact with said strand, a sealing chamber in said case, lead-in conductors terminating in said chamber and electrically connected to said strand, and a sealing material in said chamber.

21. A telemetric device comprising a pair of spaced anchoring members, said members being provided with cylindrical portions and with flanges adapted for anchoring them in concrete masses and the like, a tubular case extending between said members and fitting over said cylindrical portions, annular corrugations in said case to render it longitudinally expansible and compressible, a wire within said case, frame means arranged so as to apply an initial tension to said wire and to vary said tension responsive to variations in the separation of said anchoring members, said frame means comprising two relatively movable rigid members connected, respectively, to said anchoring members and both connected to different linear portions of said wire.

22. A telemetric device for measuring dimensional changes in concrete bodies and adapted to be embedded therein comprising a pair of spaced anchoring members being provided with means for anchoring them at separate points of reference in the concrete mass, a tubular case secured at its ends to said anchoring members and providing a sealed chamber therein, a wire within said chamber, and frame means within said chamber and connected to said anchoring members arranged so as to apply an initial tension to said wire and to vary the tension on said wire responsive to variation in the separation of said anchoring members.

23. A telemetric device for measuring dimensional changes in concrete bodies and adapted to be embedded therein comprising a pair of spaced anchoring members being provided with means for anchoring them at separate points of reference in the concrete mass, a tubular case secured at its ends to said anchoring members and providing a sealed chamber therein, a wire within said chamber, frame means within said chamber and connected to said anchoring members arranged so as to apply an initial tension to said wire and to vary the tension on said wire responsive to variation in the separation of said anchoring members, and an insulating liquid within said case.

24. The method of determining the change in distance between two points in a structure and also determining the temperature in the vicinity of said points which comprises varying the tension on an electrical conductor in the vicinity of said points in proportion to the change in separation of said points, simultaneously varying the tension on another similar electrical conductor in the vicinity of said points in inverse proportion to the change in separation of said points, measuring the ratio of the electrical resistances of said conductors to determine the change in separation of said points and measuring the combined resistance of said conductors to determine the temperature in the vicinity of said points.

25. A telemetric device comprising a first and a second anchoring member, said members having individual means for anchoring them, respectively, at two separate points on a structure subject to dimensional change of such a character as to vary the distance between said points, a first electrical resistance element comprising at least one strand of wire, a pair of support blocks arranged so as to hold said resistance element at opposite ends thereof, frame means supporting said blocks and comprising at least two relatively movable parts connected to said two anchoring members respectively, said frame parts being positionally related so as to increase the separation of said blocks responsive to an increase in separation of said anchoring members, a second resistance element comprising at least one strand of wire, a second pair of support blocks arranged so as to hold said second resistance element at opposite ends thereof, said frame means also supporting said second pair of blocks and said frame parts being positionally related so as to increase the separation of said second blocks responsive to a decrease in separation of said anchoring members, said two resistance elements being arranged so as to place an initial tension upon each other through said blocks and said frame members, and electrical terminals connected to the ends of said resistance elements.

ROY W. CARLSON.